(12) United States Patent
Willebrand

(10) Patent No.: US 6,239,888 B1
(45) Date of Patent: May 29, 2001

(54) TERRESTRIAL OPTICAL COMMUNICATION NETWORK OF INTEGRATED FIBER AND FREE-SPACE LINKS WHICH REQUIRES NO ELECTRO-OPTICAL CONVERSION BETWEEN LINKS

(75) Inventor: Heinz Willebrand, Longmont, CO (US)

(73) Assignee: LightPointe Communications, Inc., San Diego, CA (US)

( * ) Notice: Subject to any disclaimer, the term of this patent is extended or adjusted under 35 U.S.C. 154(b) by 0 days.

(21) Appl. No.: 09/065,685

(22) Filed: Apr. 24, 1998

(51) Int. Cl.⁷ .............................. H04J 14/00; H04B 10/00
(52) U.S. Cl. ..................... 359/118; 359/160; 359/172; 359/152; 359/159; 359/179; 359/341
(58) Field of Search ..................... 359/110, 134, 359/152, 159, 160, 172, 161, 188, 118, 179, 341

(56) References Cited

U.S. PATENT DOCUMENTS

| | | | |
|---|---|---|---|
| 5,005,937 | 4/1991 | Aida et al. ............................. 385/24 |
| 5,068,916 | * 11/1991 | Harrison et al. ....................... 455/39 |
| 5,083,874 | 1/1992 | Aida et al. ............................. 385/24 |
| 5,185,814 | 2/1993 | Healey ................................... 385/24 |
| 5,210,631 | 5/1993 | Huber et al. ......................... 359/132 |
| 5,301,054 | 4/1994 | Huber et al. ......................... 359/132 |
| 5,331,449 | 7/1994 | Huber et al. ......................... 359/125 |
| 5,371,734 | 12/1994 | Fischer ................................. 370/348 |
| 5,400,166 | 3/1995 | Huber .................................. 359/173 |
| 5,416,864 | 5/1995 | Cassidy et al. ........................ 385/30 |
| 5,443,227 | 8/1995 | Hsu ...................................... 244/3 R |
| 5,448,391 | * 9/1995 | Iriyama et al. ...................... 359/159 |
| 5,452,124 | 9/1995 | Baker ................................... 359/341 |
| 5,457,562 | 10/1995 | Tremblay ............................. 359/188 |
| 5,574,589 | 11/1996 | Feuer et al. .......................... 359/160 |
| 5,587,830 | 12/1996 | Chraplyvy et al. .................. 359/341 |
| 5,596,661 | 1/1997 | Henry et al. ........................... 385/15 |
| 5,654,816 | 8/1997 | Fishman ............................... 359/177 |
| 5,748,813 | * 5/1998 | Cassidy et al. ........................ 385/24 |
| 5,786,923 | * 7/1998 | Doucet et al. ....................... 359/172 |
| 5,818,619 | * 10/1998 | Medved et al. ...................... 359/172 |
| 5,844,705 | * 12/1998 | Rutledge ............................. 359/152 |
| 5,859,725 | * 1/1999 | Sugiya et al. ........................ 359/341 |
| 5,917,629 | * 6/1999 | Hortensius et al. ................. 359/136 |
| 5,946,120 | 8/1999 | Chen ................................... 359/158 |
| 5,983,068 | * 11/1999 | Tomich et al. ........................ 455/3.1 |

* cited by examiner

Primary Examiner—Kinfe-Michael Negash
(74) Attorney, Agent, or Firm—Fitch, Even, Tabin & Flannery

(57) ABSTRACT

Erbium doped fiber amplifiers (ERDAs) optically couple optical signals between free-space and fiber optic links of a terrestrial optical communication network. The optical gain of transmitting and receiving ERDAs is controlled to achieve good optical signal communication. Control occurs in response to signals received at the transmitting and receiving ends of the links. Control, status and management information may be communicated optically between link head stations. The physical position of transceivers at opposite ends of the link optical signal paths is also controlled.

47 Claims, 9 Drawing Sheets

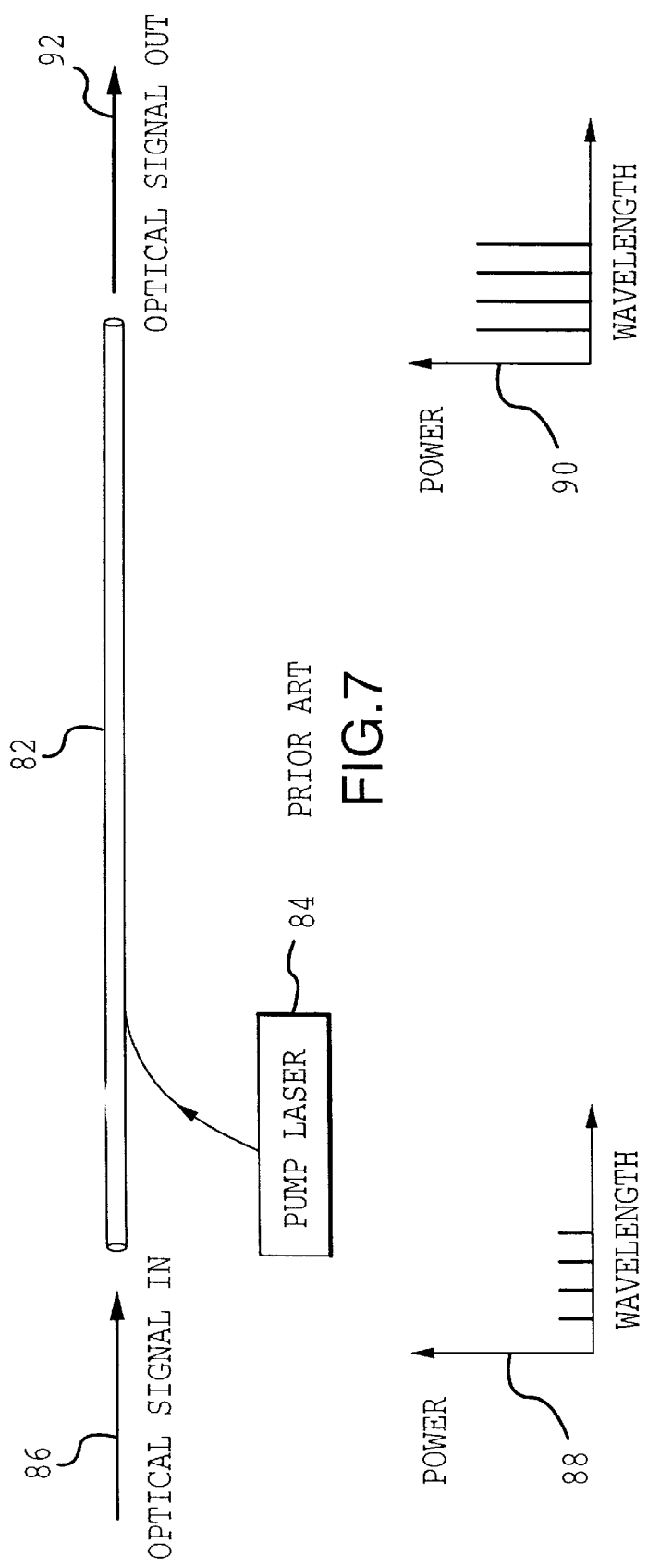

TERRESTRIAL OPTICAL COMMUNICATION NETWORK OF INTEGRATED FIBER AND FREE-SPACE LINKS WHICH REQUIRES NO ELECTRO-OPTICAL CONVERSION BETWEEN LINKS

INTRODUCTION

This invention relates to terrestrial optical communication, and more particularly to a new and improved all-optical terrestrial optical communication network which integrates both fiber and free-space links without requiring electro-optical conversion between the fiber and free-space links, and which achieves a relatively good link power margin for reliable communication in adverse atmospheric conditions, which seamlessly integrates with long-haul fiber backbone links, which provides safety against unintended eye injuries, and which is implemented with relative convenience and cost-effectiveness.

BACKGROUND OF THE INVENTION

Modern society requires that enormous amounts of information be transmitted between users in a relatively error-free manner. Most of the information is communicated as digital information, primarily because digital techniques allow more information to be communicated quickly and reliably, and because a significant amount of the information is transferred between computers. The use of computers and the evolution of computer technology is responsible for much of the increased demand for information communication. The demand for information communication has increased dramatically during the past few years and is expected to continue well into the future.

The typical medium which carries a significant amount of the information is electrical conductors or copper wires. The telephone system, having been installed for many years, is the primary media used for local or localized communications. Using wired media for telecommunications and high speed data communications creates difficulties, and these difficulties arise because of the wires. Electrical wires introduce a practical limit to the physical length or distance over which the information can travel. Lengthy conductors attenuate the signals to the point where the recognition of signals becomes difficult or impossible. Signals conducted over the wires also have a finite limit to the signaling frequency and hence the amount of information which they can carry. Furthermore, noise is relatively easily picked up or induced into the wires, and the noise tends to corrupt the signals carried by the wires. Wire conductor media is also difficult or impossible to install in many situations. Some metropolitan areas simply have no available space to accommodate the additional conductors within utility conduits, and gaining access to buildings and right-of-way to install the conductors is usually difficult or impossible and is certainly costly. For these and other reasons, many of the advancements in communications have focused on wireless media for communicating information.

Radio frequency (RF) transmissions avoid many of the physical problems associated with wired media. The atmosphere becomes the medium for the RF communications, and thus physical limitations associated with access, space, and right-of-way are no longer paramount problems. However, because the atmosphere is freely available for use by all authorized users, the possibility of interference is always present. Various techniques have been devised to minimize RF interference, but those techniques are relatively expensive to implement. Furthermore, even those techniques are not effective to assure that enormous amounts of information can be communicated reliably through RF broadcasts, simply because the information is broadcast and can not be confined to secure communication channels or links which could eliminate sources of interference.

Optical media offers many advantages compared to wired and RF media. Large amounts of information can be encoded into optical signals, and the optical signals are not subject to many of the interference and noise problems that adversely influence wired electrical communications and RF broadcasts. Furthermore, optical techniques are theoretically capable of encoding up to three orders of magnitude more information than can be practically encoded onto wired electrical or broadcast RF communications, thus offering the advantage of carrying much more information.

Fiber optics are the most prevalent type of conductors used to carry optical signals. Although the disadvantage of fiber optic conductors is that they must be physically installed, the fact that an enormous amount of information can be transmitted over the fiber optic conductors reduces the number of fiber optic conductors which must be installed. This avoids some of the problems in metropolitan areas were space for additional cables is difficult to obtain. In those circumstances where the information is communicated over long distances, fiber optic conductors are the typical medium employed for such long-haul transmissions.

Free-space atmospheric links have also been employed to communicate information optically. A free-space link extends in a line of sight path between the optical transmitter and the optical receiver. Free-space optical links have the advantage of not requiring a physical installation of conductors. Free-space optical links also offer the advantage of selectivity in eliminating sources of interference, because the optical links can be focused directly between the optical transmitters and receivers, unlike RF communications which are broadcast without directionality. Therefore, any adverse influences not present in this direct, line-of-sight path or link will not interfere with optical signals communicated.

Despite their advantages, optical free-space links present problems. The quality and power of the optical signal transmitted depends significantly on the atmospheric conditions existing between the optical transmitter and optical receiver at the ends of the link. Rain drops, fog, snow, smoke, dust or the like in the atmosphere will refract or diffuse the optical beam, causing a reduction or attenuation in the optical power at the receiver. The length of the free-space optical link also influences the amount of power attenuation, because longer free-space links will naturally contain more atmospheric factors to potentially diffuse the optical beam than shorter links. Furthermore, optical beams naturally diverge as they travel greater distances. The resulting beam divergence reduces the amount of power available for detection. If the attenuation of the optical beam is sufficiently great, the ability to recognize the information communicated on a reliable basis is diminished, and the possibility that errors in communication will arise is elevated. Atmospheric attenuation particularly diminishes the probabilities of error-free communications at higher transmission frequencies, because atmospheric attenuation naturally occurs to a greater extent at higher optical frequencies, i.e. shorter wavelengths, than at lower optical frequencies.

One approach to reducing the adverse influences of atmospheric attenuation is to use laser beam transmissions in the free-space links at frequencies which are capable of greater penetration and less refraction or diffusion by atmospheric influences. Unfortunately, the more penetrating frequencies are sometimes also the ones which can easily damage human eyes. To maintain safety while still avoiding some of the problems from atmospheric attenuation, the amount of power which is optically transmitted at these more penetrating frequencies is substantially limited. Since the more penetrating frequencies are also subject to beam divergence, reducing the power still complicates the reliable communication of information. Consequently, the reduced power transmission levels counter-balance the benefits of the lesser atmospheric attenuation at the more penetrating frequencies. Because of the reduced power at the more penetrating frequencies, the effective length of the free-space optical links is still limited.

Furthermore, the more-penetrating, free-space optical frequencies are different from those frequencies which are typically employed to transmit information over long-haul fiber communication systems. An electro-optical conversion is required to convert the fiber link backbone transmission frequency to the free-space transmission frequency. An electro-optical conversion involves converting the higher frequency optical signals to electrical signals and back to optical signals at the more penetrating laser frequency, and vice versa. Additional equipment is required to accomplish the conversion, resulting in an increase in the cost and complexity of the terrestrial optical communications network.

In addition, electro-optical conversions also introduce the possibility that errors will be created during the conversion, particularly under the common situation of the fiber optic signal carrying information at multiple different wavelengths. Common optical detectors respond to information in a broad frequency range or wavelength band, and this broad-band response destroys the information carried at specific wavelengths. To avoid this problem and to maintain the information present in the different, specific wavelength optical signals, the optical signal must first be filtered into its different wavelength components. Thereafter each different wavelength component must be separately electro-optically converted, and then all of the separate converted components combined back into a single optical signal. The complexity of this process raises the possibilities of introducing errors in the information communicated and increases the costs of the equipment used in the terrestrial optical communication network.

Electro-optical conversion has also been used to amplify the light signals conducted over fiber optic cables. The light signals conducted over fiber cables will attenuate, and it is periodically necessary to amplify those signals in order to maintain signal strength. Recently however, erbium doped fiber amplifiers (ERDAs) have been developed to amplify the light signals optically, without requiring electro-optical conversion, as the light signals pass through the optical fiber. ERDAs allow light to be amplified in a relatively wide wavelength band (about 30 nanometers (nm)) around a 1.55 micrometer (um) fundamental wavelength. ERDAs are of particular advantage in long haul telecommunications systems, because these systems normally operate in the 1.55 um wavelength range. The broad band amplification of ERDAs around the 1.55 um fundamental frequency allows the ERDAs to be integrated into systems using wavelength division multiplexing (WDM), resulting in the ability to communicate separate information at different wavelengths simultaneously in the same fiber. Thus, ERDAs are of particular importance and value in long haul fiber telecommunication systems because electro-optical conversions can be avoided.

It is with respect to these and other background information factors relevant to the field of terrestrial optical communications that the present invention has evolved.

SUMMARY OF THE INVENTION

One of the important improvements of the present invention relates to the seamless, all-optical integration of fiber optic links and free-space links in a terrestrial communication network without electro-optical conversion between the free-space and fiber optic links. Another improvement relates to communicating information over fiber optic links and free-space links in a terrestrial optical communication network at wavelengths which do not require frequency conversion. Another improvement relates to operating free-space optical links in a terrestrial optical communication network at laser wavelengths which are safer to human eyesight with sufficient link power margin to avoid many of adverse influences of atmospheric attenuation and divergence. Still another improvement involves operating a terrestrial optical communication network with free-space links at a fundamental wavelength which is compatible with or approximately equal to the fundamental wavelength typically used in long-haul optical communication systems. A further improvement relates to establishing free-space links in a terrestrial optical communication network which are not line-of-sight and without using optical repeaters that require electro-optical conversion. Still a further improvement relates to changing the physical orientation of the optical receivers and transmitters to maximize the link power margins of the optical beam and thereby increase the reliability of the transmission. A last specifically mentioned improvement, among others which are not specifically mentioned here, is to is to implement a relatively low cost, terrestrial, all-optical communication network by making effective use of erbium doped fiber amplifiers (ERDAs).

These and other improvements are attained by a terrestrial optical communication network which comprises a plurality of fiber optic links and free-space links between which optical signals are optically coupled by erbium doped fiber amplifiers (ERDAs), and by a method of terrestrial optical communication which comprises the steps of establishing a plurality of fiber optic links and free-space links between which optical signals are optically coupled without electro-optical conversion, preferably by ERDAs. The ERDAs optically couple the optical signals between the fiber optic and free-space links, thereby avoiding the necessity for electro-optical conversion as the optical signals transition between the free-space and fiber optic links. The relatively inexpensive ERDAs produce all-optical, relatively broad-band amplification, which avoids the necessity for electro-optical conversion. The fundamental wavelength of the ERDAs is also compatible with the fundamental wavelength used in long-haul and backbone communication systems, thereby allowing a convenient integration of the network of the present invention with those communication systems. The fundamental wavelength of the ERDAs is also safer to human eyesight.

Other improvements are attained by a terrestrial optical communication network which comprises a plurality of links between which optical signals are optically communicated by a transmitting ERDA. The transmitting ERDA amplifies an optical signal before its transmission over a link and a controller connected to the transmitting ERDA controls the optical power gain of the transmitting ERDA. The controller adjusts the optical power of the transmitted optical signal in response to the optical power of optical signals received over the link. A related method of terrestrial optical communication involves sensing the optical power of optical signals received over the link and adjusting the optical power of the optical signal transmitted over the link in response to the sensed optical power of the received optical signals.

Other preferred aspects of the power control improvements include controlling the optical power gain in response to the received power of signals at the transmitting and receiving locations, controlling the optical power gain of a receiving amplifier, transmitting power control information optically between the receiving and transmitting ends of the links, and controlling the optical gain of the transmitting and receiving ERDAs to obtain the best quality signals.

By controlling the power transmitted and received in accordance with these improvements, the disadvantage of the less penetrating wavelengths of the ERDAs is minimized by the higher power available for optical communication. Furthermore, the power control improvements obtain a better quality optical signal for communicating information.

Still other improvements are attained by a terrestrial optical communication network which comprises a plurality of links between which optical signals are optically communicated by a transceiver which transmits and receives optical signals communicated over a link and a controller connected to the transceiver to control the physical position of the transceiver relative to the optical signal path of the link in response to the optical signals received over the link. A method of terrestrial optical communication comprises the steps of connecting an adjustment mechanism to the transceiver to adjust the position of the transceiver and adjusting the position of the transceiver by controlling the adjustment mechanism. By controlling the position of the adjustment mechanism in accordance with these improvements, a better quality optical signal for communicating information is assured.

A more complete appreciation of the present invention and its scope can be obtained by reference to the accompanying drawings, which are briefly summarized below, to the following detailed description of presently preferred embodiments of the invention, and to the appended claims.

BRIEF DESCRIPTION OF THE DRAWINGS

FIG. 7 is a simplified illustration of a prior art erbium doped fiber amplifier (ERDA) used in the transceivers, repeaters and routing switches of the network shown in FIG. 1.

FIG. 8 is an exemplary graph of the power at multiple different wavelengths of an optical signal received by the ERDA shown in FIG. 7.

FIG. 9 is an exemplary graph of the power at multiple different wavelengths of an optical signal supplied after amplification by the ERDA shown in FIG. 7.

DETAILED DESCRIPTION

Figure 1:
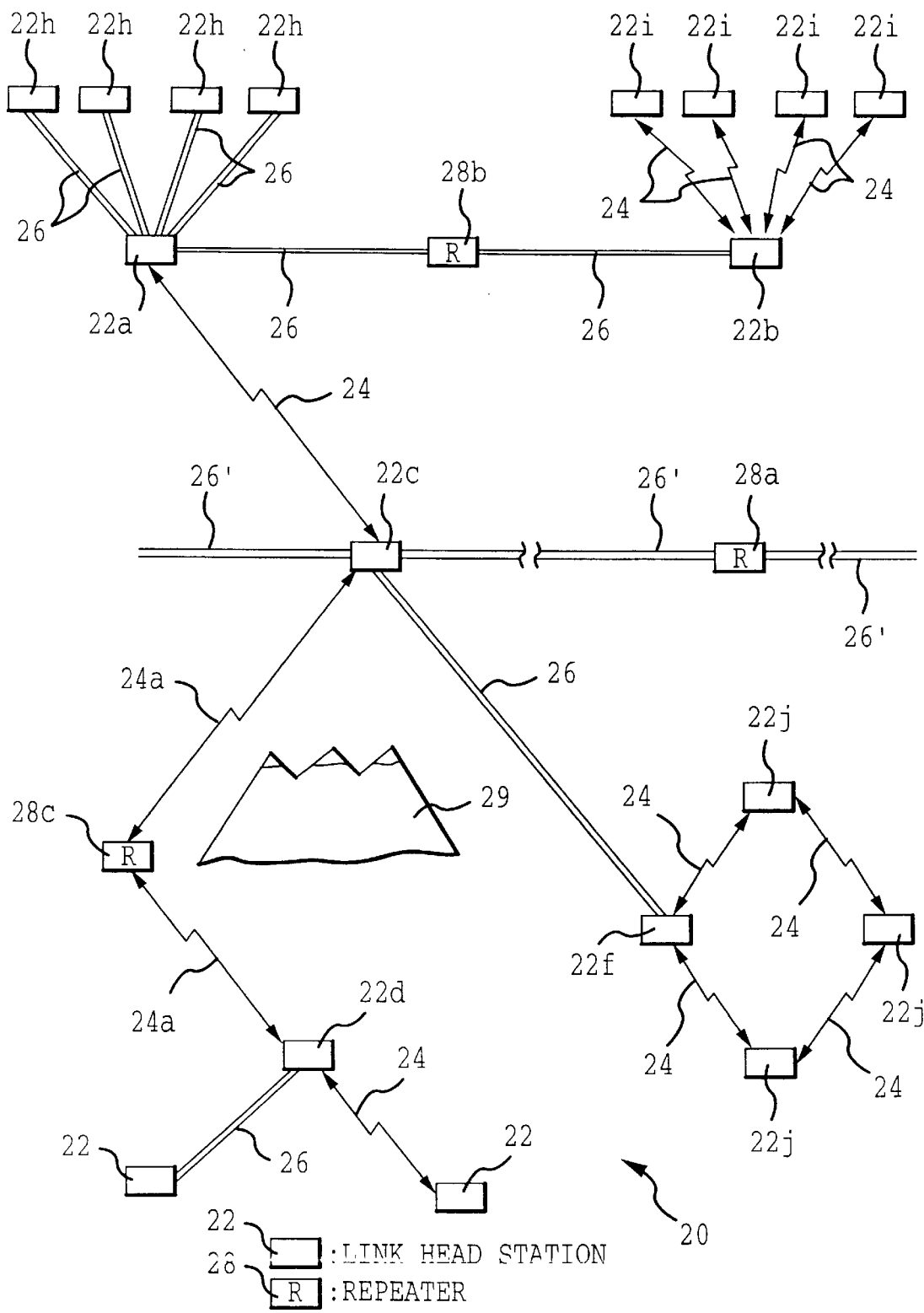
FIG. 1 is a block diagram illustration of a terrestrial all-optical communications network which integrates both fiber optic and free-space links and which incorporates the present invention.

The improvements of the present invention are incorporated in a terrestrial optical communications network 20 such as is shown in FIG. 1. The terrestrial optical network 20 includes a plurality of link head stations 22 between and through which optical signals are communicated. The optical signals are conducted over free-space optical links 24 and fiber optic conductor links 26 which extend between the link head stations 22. The free-space links 24 and the fiber links 26 are integrated together in the network 20 in a seamless manner, to avoid electro-optical conversion of the optical signals transferred between the free-space links 24 and the fiber links 26, and to communicate optical signals of the same frequency and wavelength over both the free-space and fiber links, in accordance with the present invention.

The optical signals conducted over the free-space links 24 and the fiber links 26 are preferably laser beams whose fundamental frequency or wavelength is encoded by signals of other frequencies which contain the information to be communicated. Upon receipt of the laser beam which has been encoded with information, the information is separated or decoded from the fundamental wavelength and separated into the individual information signals. A variety of different techniques are known and available for encoding and decoding information onto and from fundamental wavelength optical signals, such as wave division multiplexing (WDM). Once separated into the individual information containing signals, the optical information is typically converted to electrical signal information and used by computer equipment located at and connected to each link head station 22. The computer equipment connected to each link head station 22 is conventional communications equipment, such as telephone equipment, data communications equipment, a mainframe or server computer, a wired or optical local area network node, or the like.

Some of the link head stations 22 and links 24 and 26 of the network 20 have characteristics and functions which are more specifically described below. Some of the stations and links are referred to in FIG. 1 by additional alphabetical or other references for convenience of description. The network 20 may be connected to a fiber optic conductor 26' which forms part of a wide area, metropolitan area or long-haul optical backbone fiber communication network or system. Thus, the network 20 may include fiber optic backbone links 26' which extend considerable geographic distances. Due to the length of some links 26', a repeater station 28a is positioned at a predetermined physically separated interval in the links 26'. The function of each repeater station 28a is to boost the optical power of the signals communicated over the links 26'. Preferably each repeater station 28a employs erbium doped fiber amplifiers (ERDAs). ERDAs are purely optical power amplifiers which are placed in-line in the links 26' to boost the strength of the optical signal without requiring electro-optical conversion.

In addition, a repeater station 28b may also be included in the fiber links 26 extending between stations 22a and 22b of the network 20, if the geographic distance between the stations 22a and 22b is sufficient to require amplification of the optical signal. The repeater station 28b functions in a similar manner to the backbone repeater station 28a.

A repeater 28c is included in the free-space link 24a which extends between stations 22c and 22d. In addition to amplifying the optical signal in the free-space link 24a, the repeater station 28c allows the free-space link 24a to be diverted around a natural or manmade obstacle, which is exemplified by a mountain 29 as shown in FIG. 1. The free-space link 24a is therefore not a line-of-sight optical path between the link head stations 22c and 22d.

Some of the link head stations 22 may also function as routing switches for information communicated over the links 24 and 26. For example, the link head station 22b may have the capability to route optical signals received from the fiber link 26 to one or more of the link head stations 22i. Thus, optical signals destined for only one of the link head stations 22i may be communicated from station 22b to that station 22i without transmitting the same optical signal to the other stations 22i to which the signal was not destined. Similarly, the link head station 22a acts as a routing switch for information destined for the stations 22h, and the link head station 22d routes optical signals to the two stations 22 which are connected to it by the free-space link 24 and the fiber link 26.

Lastly, the link head station 22c acts both as a routing switch and as a repeater for the signals in the fiber backbone links 26'. With respect to its routing function, the station 22c directs optical signals to the stations 22a, 22d and 22f. With respect to its repeater function, the station 22c amplifies optical signals conducted through it over the fiber backbone links 26'.

The stations 22h and the station 22a are connected in a conventional star or bus configuration by the fiber links 26. The station 22b likewise connects the stations 22i in a conventional star or bus configuration by the free-space links 24. Stations 22j are connected in a conventional ring configuration with the station 22f, and the station 22f functions as a node for that ring configuration as well as a station 22 for the network 20. The ring, bus and star configurations are conventional connection topographies for communications networks, and it is apparent that the network 20 may include any or all of these configurations.

Figure 2:
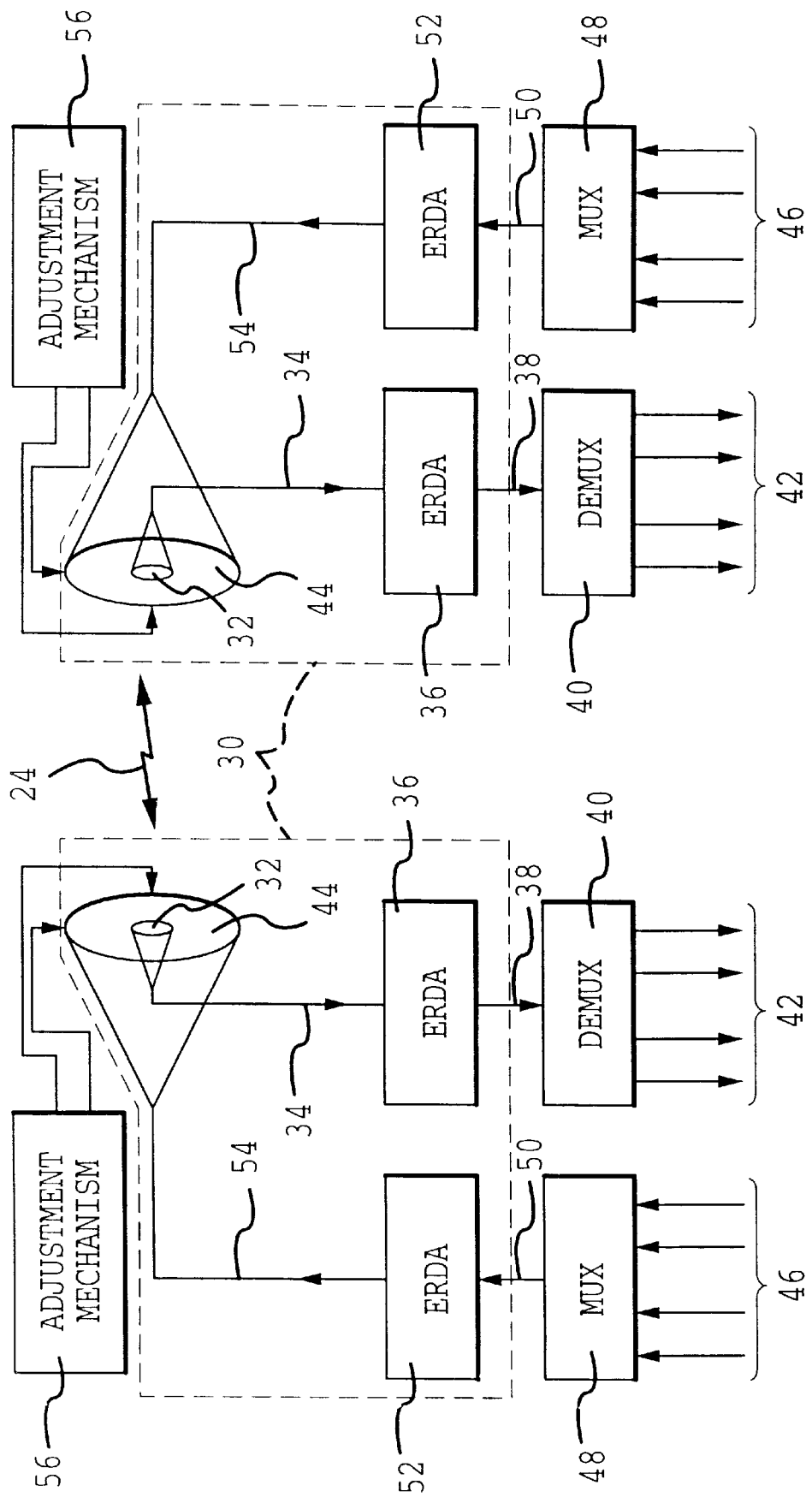
FIG. 2 is a block diagram of portions of two link head stations with optical transceivers located at opposite ends of a free-space link of the network shown in FIG. 1.

Each station 22 includes an optical transceiver to communicate optical signals over the free-space link 24 or the fiber link 26. An example of an optical transceiver 30 is shown in FIG. 2. A transceiver 30 is located at each link head station 22 of a free-space optical link 24. Each optical transceiver 30 includes a received beam focusing element 32 which receives and focuses the optical signal from the free-space link 24 into an optical fiber 34. The beam focusing element 32 may be a lens, a parabolic mirror or the like, all of which are conventional in optical communications systems. The optical fiber 34 is connected in-line with an ERDA 36 which amplifies the strength of the received optical signal from the link 24 and supplies it on an optical fiber 38. The optical fiber 38 connects to a conventional wavelength division multiplexing (WDM) device or demultiplexer 40. The demultiplexer 40 divides the optical signal into its various components and supplies those separated signals at 42. The optical signals supplied at 42 are supplied to optical converters (not shown) which convert the optical signals to electrical signals if the equipment present at the link head station 22 (FIG. 1) receives and requires electrical signals.

In a similar manner, the transceiver 30 also includes a conventional transmitted beam focusing element 44 which focuses and directs the outgoing optical beam through the optical link 24. The signals which comprise the transmitted beam originate at 46 from equipment located at the link head station. The signals 46 are optical signals, either as originally created or as derived from an electro-optical conversion at the link head station. The signals 46 are applied to a WDM device or multiplexer 48, which multiplexes the separate signals at 46 into a single optical signal and applies the single optical signal to a fiber optic conductor 50. An ERDA 52 is connected in-line with the fiber conductor 50. The ERDA 52 receives the signal from the fiber conductor 50, amplifies its optical signal strength or power, and supplies the amplified signal to a fiber optic conductor 54. The fiber optic conductor 54 delivers the amplified optical signal to the transmitted beam focusing element 44 which transmits the optical signal over the free-space link 24.

The link head station 22 at the opposite end of the free-space link 24 is similar in configuration, as shown in FIG. 2. Because the physical position or angular orientation of the transceivers 30 at the ends of the free-space links 24 may move, a position adjusting mechanism 56 is preferably connected to each beam focusing elements 32 and 44. The adjusting mechanism 56 adjusts the angular position of the elements 32 and 44 in the horizontal and vertical references to track any changes in the angular position of the received beam.

The angular position of the received beam may change as a result of the transmitting station being connected to a high-rise office building which sways back and forth under the influence of wind, for example. As another example, if a cloud or fog moves through the free-space link 24, the water in the cloud or fog may slightly refract the optical beam. The position adjusting mechanism 56 responds to control signals to move the position of the focusing elements 32 and 44.

Because the ERDAs 36 and 52 of each transceiver 30 are connected by the optical fibers 34 and 54 to the beam focusing elements 32 and 44, respectively, the ERDAs 36 and 52 do not need to be physically located at the location of the beam focusing elements 32 and 44. Instead, the ERDAs may be located inside a building or other shelter, in a more thermally stable environment to achieve enhanced performance.

Figure 3:
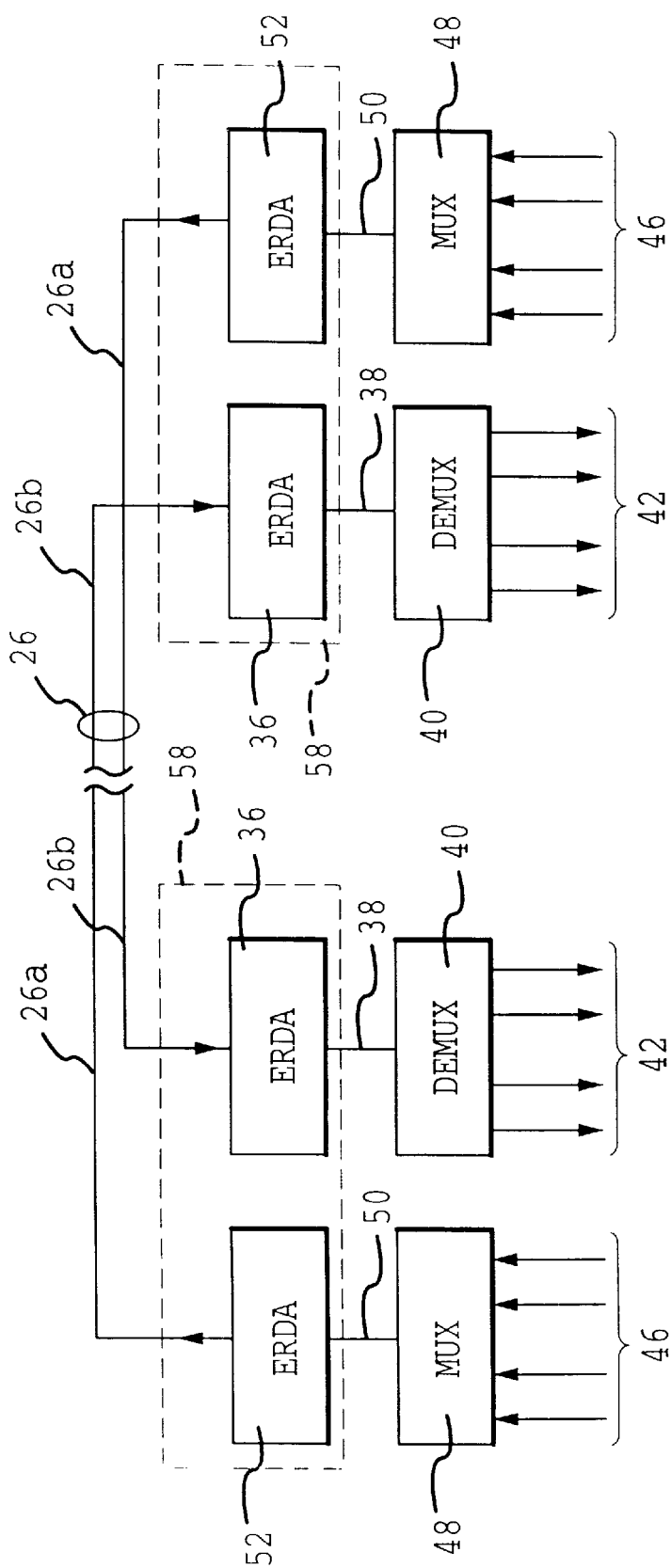
FIG. 3 is a block diagram of portions of two link head stations with optical transceivers located at opposite ends of a fiber optic link of the network shown in FIG. 1.

An example of a transceiver employed at the link head stations 22 (FIG. 1) at the ends of fiber optic links 26 is shown at 58 in FIG. 3. As compared to the free-space link transceiver 30 shown in FIG. 2, the fiber link transceivers 58 do not employ beam focusing elements 32 an 44 (FIG. 2), because the fiber optic conductors 26a and 26b carry and confine the optical signals. The optical signals are directly received by the receiving ERDA 36 from the optic conductor 26b and are amplified before they are applied to the demultiplexer 40. Similarly, the transmitting ERDA 52 receives the signal from the multiplexer 48 and amplifies it before supplying it to the fiber optic link conductor 26a.

Figure 4:
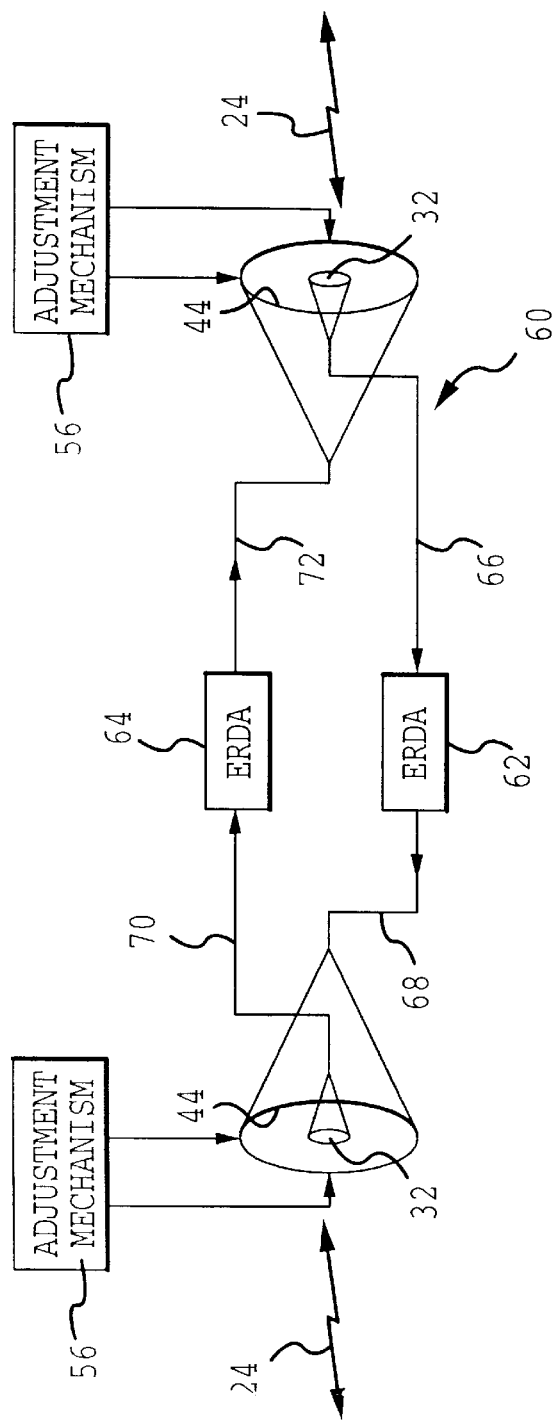
FIG. 4 is a block diagram of portions of a repeater used in a free-space link of the network shown in FIG. 1.

An example of a transceiver 60 employed in a free-space repeater, (e.g. 28c, FIG. 1), is shown in FIG. 4. The free-space repeater transceiver 60 also includes two ERDAs 62 and 64 which function to amplify the optical signals which are received and transmitted. For example, the ERDA 62 receives optical signals conducted over a fiber optic cable 66 from the received beam focusing element 32 shown on the right-hand side of FIG. 4, amplifies those optical signals without electro-optical conversion and supplies the amplified optical signals on a fiber optic cable 68 to the transmitting beam focusing element 44 shown on the left hand side of FIG. 4. Similarly, the receiving beam focusing element 32 shown on the left hand side of FIG. 4 receives optical signals, and those signals are conducted over the fiber optic conductor 70 to the ERDA 64. The ERDA 64 amplifies those signals and supplies the amplified signals over the fiber optic conductor 72 to the transmitting beam focusing element 44 shown on the right hand side of FIG. 4. Position adjusting mechanisms 56 may also be connected to each of the beam focusing elements 32 and 44 of the repeater amplifier transceiver 60. The ERDAs 62 and 64 of the transceiver 60 amplify the optical signals in the free-space links 24 which are passed in both directions through the repeater, without electro-optical conversion.

Figure 5:
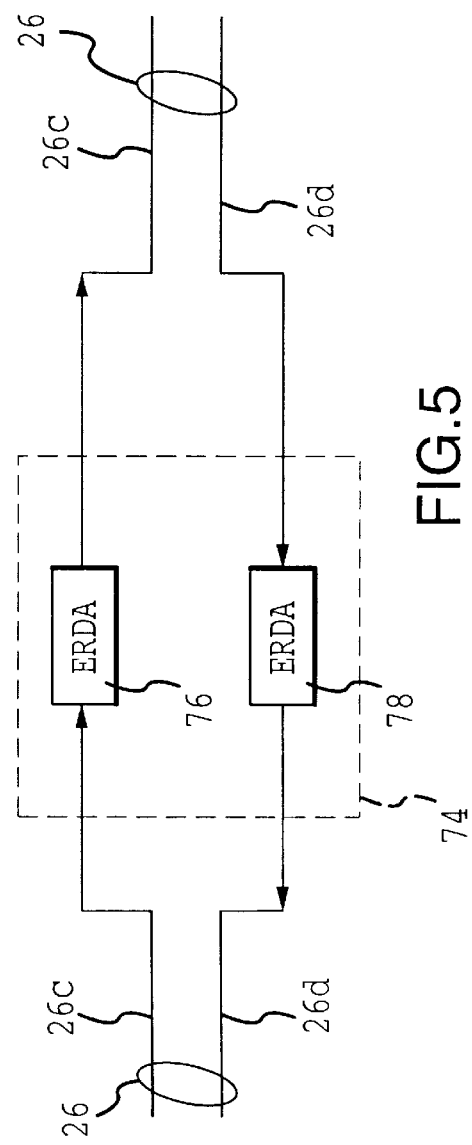
FIG. 5 is a block diagram of portions of a repeater used in optical fiber link of the network shown in FIG. 1.

An example of a transceiver for a fiber optic repeater (e.g. 28a or 28b, FIG. 1) is shown at 74 in FIG. 5. The transceiver 74 comprises two ERDAs 76 and 78. The ERDA 76 is connected in the fiber optic conductor 26c of the fiber link 26, and operates to amplify the optical signals conducted over that fiber conductor 26c as those signals pass through the ERDA 76. Similarly the ERDA 78 is connected in the fiber optic conductor 26d and it operates to amplify the optical signals conducted over that conductor. Thus, the optical signals which pass in both directions through the repeater transceiver 74 are amplified. The ERDAs 76 and 78 are directly connected in-line in the optical signal paths of the fiber link 26, and amplify the power of the optical signal conducted through the fiber links 26 without electro-optical conversion.

Figure 6:
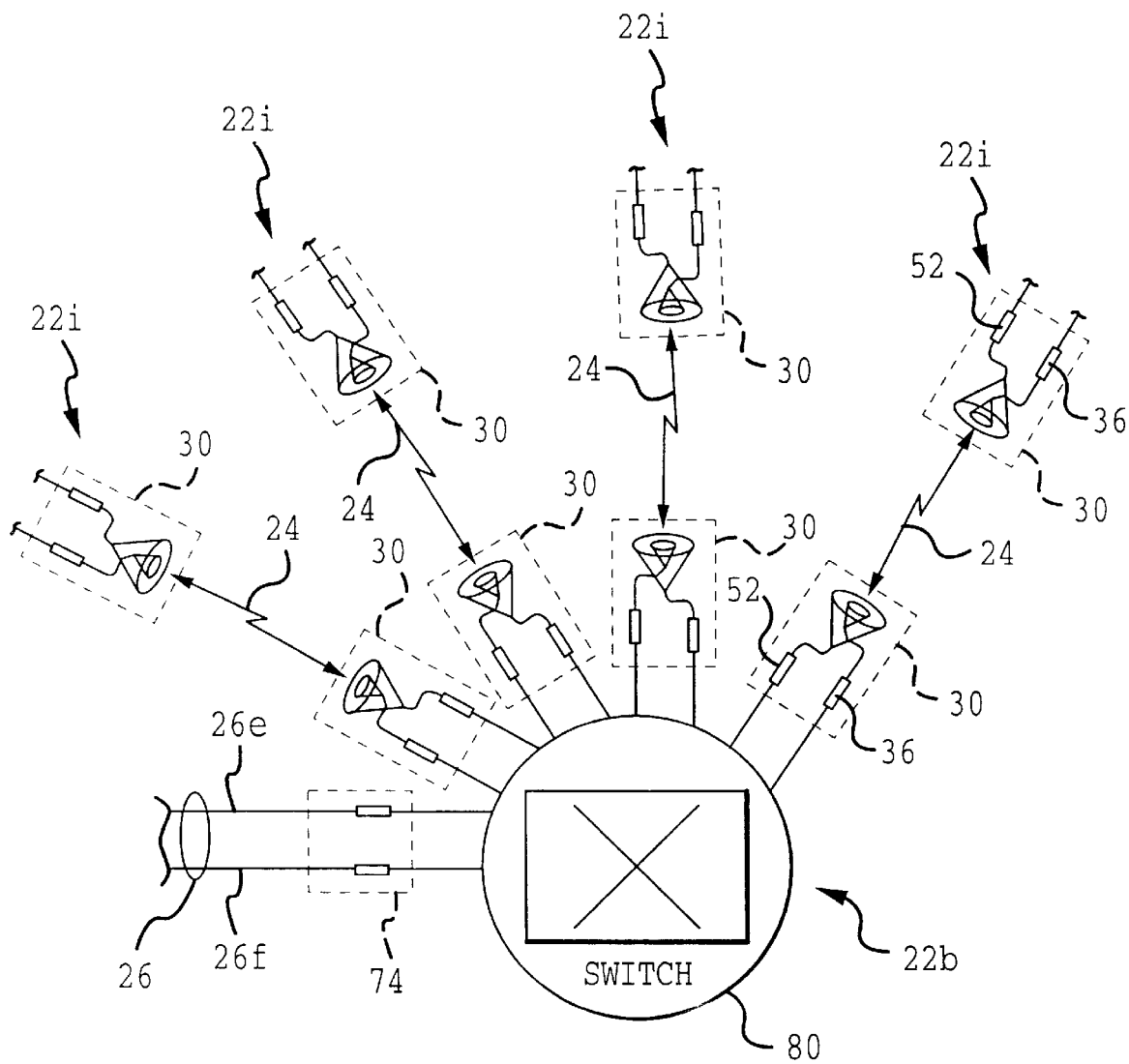
FIG. 6 is a block diagram of a routing switch used in the network shown in FIG. 1.

The routing switch function of the stations is exemplified by the station 22b, which includes a known and commercially available optical routing switch 80, shown in FIG. 6. The routing switch 80 has the capability of responding to information contained in the optical signals received from the fiber links 26e and 26f. Based on the routing information contained in the optical signals received from the fiber link 26 through the fiber link transceiver 74, the routing switch 80 activates the appropriate one of the free-space transceivers 30 to transmit the optical information to the selected one of the stations 22i. Information originating at one of the stations 22i is transmitted over the free-space link 24 as an optical signal by the transceiver 30 at that station 22i and is received by the transceiver 30 of the routing switch 80. Transmitting optical signals in this manner occurs whenever the information becomes available at the transmitting station 22i. Upon receipt of the optical signal from the transmitting stations 22i, the routing switch 80 may transmit that information in an optical signal to another one of the stations 22i, if the information is destined for that station, or the routing switch 80 may transmit the optical signal through the fiber link transceiver 74 over the fiber link 26.

As is apparent from the previous discussion, all of the link head stations 22 and the repeater stations 28 use ERDAs to amplify the received and transmitted optical signals. The ERDAs do not require electro-optical conversion in order to obtain the power levels necessary to assure reliable communication of the information carried by the optical signals.

The functional characteristics of a conventional ERDA are better understood by reference to FIG. 7, and to FIGS. 8 and 9 which graphically illustrate the power amplification from an ERDA. The ERDA includes a core 82 of optical fiber which has been doped with erbium. A pump laser 84 supplies additional optical energy to the doped fiber core 82. Preferably the pump laser 84 is a laser diode which is controlled by electrical signals supplied to it. The ability to amplify the signals without electro-optical conversion results because of the interaction of the erbium doping with additional light energy supplied by the pump laser 84. The erbium of the ERDA interacts with the additional light energy added by the pump laser 84 to amplify the strength or optical power of the transmitted optical signals.

An optical signal 86 to be amplified is received at the left hand end (as shown in FIG. 7) of the doped fiber core 82, and this received signal has power at each of four information-carrying wavelengths as shown by a power graph 88 (FIG. 8). As the signal passes through the doped fiber core 82, the energy from the pump laser 84 is added to the energy of the signal 86 by interaction of the erbium with the added light energy from the pump laser 84. The added energy increases the power content of each of the four wavelengths as shown by a power graph 90 (FIG. 9). Thus, the transmitted signal 92 is considerably increased in optical power at all four wavelengths compared to the received signal 86, and the increase in power is achieved completely by optical action of the erbium and the light energy from the pumped laser 84, without electro-optical conversion.

In practical application, conventional ERDAs employ single spatial mode laser diodes as the pump light source and division multiplexing couplers to couple the pump light from the laser diodes into the erbium doped fiber optic core. This approach makes power scaling beyond approximately 50 milliwatt (mW) impractical because the power available from single spatial mode laser diodes is small, approximately 0.1 mW. Thus, multiple diodes are usually needed.

The need for multiple diodes can be circumvented through the use of double cladding fibers in which the light propagates in a relatively large inner cladding of approximately 100 um to 400 um diameter and is absorbed by a doped single mode core. The inner cladding diameter is sufficiently large to allow efficient coupling of non-diffraction limited emission from high power broad area laser diodes. Such pump lasers are widely available at a very low cost and generate an output power of approximately 1.0 Watt for a stripe width of 100 um. Thus, ERDAs using double cladding fibers are of a particular advantage to obtain relatively high power outputs.

Furthermore, the performance of double cladding ERDAs may be further enhanced by co-doping the fiber core with both erbium and ytterbium, as is known. Co-doped fiber cores of this nature achieve short pump absorption lengths at a pump wavelength near the 975 nm ytterbium absorption peak. The pump-excited ytterbium atoms transfer their energy in a non-radiating manner to the erbium atoms, resulting in a more enhanced optical gain at the 1.55 um wavelength.

Another known aspect of ERDA technology which may be advantageously used in the present invention is a V-groove side pumping technique. A V-groove is directly formed into the side wall of the doped fiber core. Pump light incident on the fiber side wall impinges on the optically smooth facet of the V-groove, and is reflected and coupled into the inner cladding of the fiber core. Because of total internal reflection occurring at the glass-to-air facet interface, very efficient coupling can be achieved, and a diode-to-fiber coupling efficiency of 80 percent is possible using a 100 um broad band stripe laser and a double cladding fiber with a 50 by 120 um rectangular inner cladding. The V-groove side pumping technique allows the fiber core ends to be unobstructed, allowing them to be directly spliced to other fibers. Multiple V-grooves may be formed in the fiber core to inject power at multiple points. The V-grooves do not introduce reflections or losses into the signal in the core. These advantages create a compact and efficient ERDA at a lower cost compared to other high power optical amplifiers.

ERDAs were originally developed as fiber link repeater amplifiers. Erbium doping of an optical fiber allows light amplification in a broad wavelength band of approximately 30 nm centered around a basic wavelength of 1.55 um. The wavelength of 1.55 um is usually employed in long-haul optical communication systems, so the ERDAs are particularly advantageous in those long-haul fiber optic applications. The 1.55 um wavelength has not previously been regarded as important in optical communication networks with free-space links, because the 1.55 um wavelength is susceptible to significant amounts of refraction due to atmospheric attenuation. Although the 1.55 um wavelength is not as effective in penetrating the atmosphere when atmospheric attenuation conditions are present, higher powers of the 1.55 um optical signal can be safely used to counter-balance the less penetrating characteristics of the 1.55 um wavelength.

Furthermore, the present invention uses several techniques to assure that an optimum amount of power is available in the free-space links despite the presence of atmospheric attenuating conditions. Those techniques include adaptive power control to control the received and transmitted power levels at the link head stations to account for and overcome attenuating atmospheric conditions, and beam tracking to physically move the transceivers into better positions to receive the optical beam.

The adaptive power control technique of the present invention is based on the recognition that the transceivers of both link head stations transmit the optical signals through the same atmospheric media. The free-space link between both transceivers exhibits the same attenuation characteristics, regardless of the direction of propagation of the optical signal. Power control is accomplished at each link head station, based on a comparison of the received signal strength to an optimum signal strength which has previously been established for that free-space link. If the received signal strength is less than the optimum value, the power controller increases the amplifying power of the transmitting ERDA, based on the assumption that the receiving link head station is likewise receiving a lower than optimum amount of power in its received optical signals. The controller may likewise increase the amplifying power of the ERDA to boost the optical power of the signal which is delivered after receipt. If the received signal strength is greater than the optimum value, the power controller decreases the power from the transmitting and receiving ERDAs, again based on the same assumption. A similar adaptation of the power control at the other link head station occurs, until both stations have established the optimum power levels for the atmospheric conditions through the free-space link which connects them.

Figure 10:
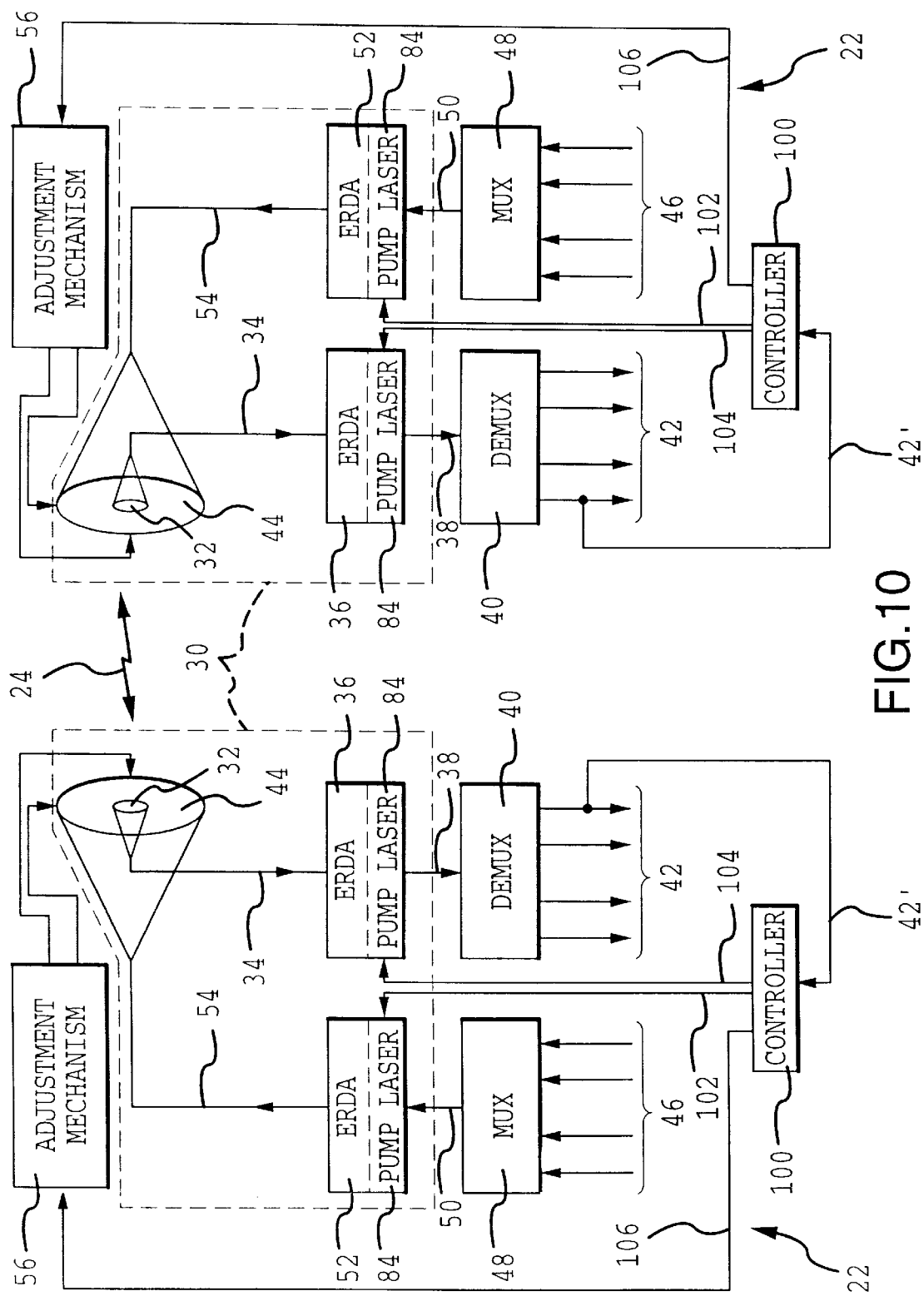
FIG. 10 is a block diagram of portions of two link head stations with optical transceivers located at opposite ends of a free-space link of the network shown in FIG. 1, which accomplish adaptive power control of the optical signal communicated therebetween.

The two link head stations 22 shown in FIG. 10 are capable of this form of adaptive power control. Each link head station 22 incorporates the transceiver 30 previously described in conjunction with FIG. 2. Of the received signals 42, one of them 42' is applied to a controller 100. The controller 100 contains a microprocessor or microcontroller, memory and other associated equipment, all of which has been programmed to function as described herein. Among other functions, the controller 100 determines the strength of the received signal 42'. Based on the strength of the received signal 42', the controller 100 delivers control signals at 102 and 104 to the pump lasers 84 associated with the transmitting and receiving ERDAs 52 and 36, respectively. The control signal 102 controls the amount of light energy supplied by the pump laser 84 to the doped core of the ERDA 52 and the degree of power amplification achieved by the transmitting ERDA 52. The control signal 104 controls the amount of light energy supplied by the pump laser 84 to the doped core of the ERDA 36 and the degree of power amplification achieved by the receiving ERDA 36

The controller 100 contains information recorded in memory, preferably in lookup tables, which defines a predetermined optimum value of optical power to achieve good communication under clear and unimpeded weather conditions. Upon determining that the power of the received signal 42' is different from this optimum value, the difference in values is used to derive the control signals 102 and 104. The control signal 102 is applied to the pump laser 84 to cause the transmitting ERDA 52 to deliver that amount of optical power which should cause receiving link head station 22 to experience a power level or power margin equivalent to that under optimum conditions. Similarly, the control signal 104 causes the received signal 38 to attain that optimum power level for good recognition and communication at the link head station. A similar power adaption occurs at the other link head station 22.

The result of these adaptive power controlling actions is that the power levels are established for good communication between the transceivers 30. Under optimal conditions, the amount of power amplification of the transmitting and receiving ERDAs will be approximately equal. Such equality contains the maximum optical signal gain with regard to noise. The variable amplifier power levels assure that adequate power or link margins exist at each transceiver. Because each link head station 22 adapts its power output based on the power content of the received signal without feedback from the other link head station, the controller 100 also preferably establishes the power gain for the transmitting ERDAs in a dampened, time delayed or step-by-step manner to avoid an unstable hunting or oscillation of the signal strength between the link head stations. With appropriate dampening, the transmitting and receiving ERDAs of both transceiver at opposite ends of each link can achieve optimal operating conditions for communications.

Figure 11:
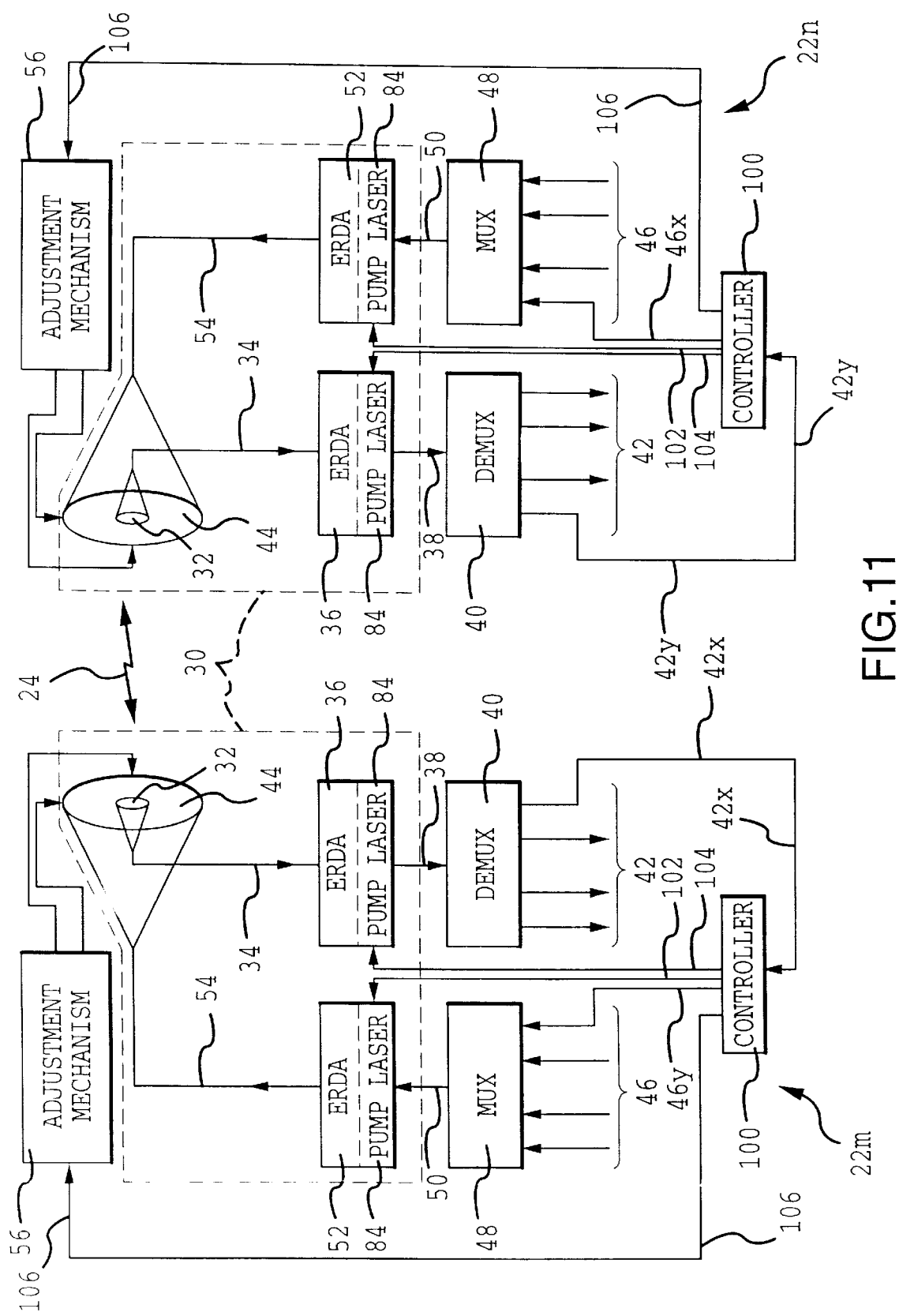
FIG. 11 is a block diagram of portions of two link head stations with optical transceivers located at opposite ends of a free-space link of the network shown in FIG. 1, which accomplish another type of adaptive power control of the optical signal communicated therebetween.

Another technique of adaptive power control makes use of feedback information from the other link head station, and this technique is shown in FIG. 11. In this feedback form of adaptive power control, one of the signals communicated between the link head stations 22m and 22n is used to communicate status and control information between the link head stations 22m and 22n. To illustrate, the signal 42x is received by the link head station 22m. The signal 42x contains control information supplied by the transmitting link head station 22n at the other end of the free-space link 24. The control information within the signal 42x describes the power level which the controller 100 at the station 22n has determined to be optimum for receiving the signals transmitted from the station 22m. The power control information contained in signal 42x has been derived by the station 22n based on the strength of the signals it has received in the past from the station 22m. Based on the information contained in the signal 42x, the controller 100 at the station 22m delivers the control signals 102 and 104 to the pump laser 84 of the transmitting and receiving ERDAs 52 and 36, respectively, and the signals transmitted from the station 22m thereafter contain the power level which the station 22n has previously determined would be optimum for reception of those signals.

Similarly, the controller 100 of the station 22m supplies a control signal 46y to the multiplexer 48. The signal 46y is derived by the controller 100 of station 22m based on the strength of the signals which station 22m has previously received from station 22n. The control signal 42y is multiplexed by the multiplexer 48 with the other information-containing signals 46 and is transmitted by the ERDA 52 of station 22m over the free-space link 24 to the other station 22n. The station 22n receives the information from the transmitted signal 46y as the received signal 42y. The information contained in the signal 42y is interpreted by the controller 100 of the station 22n, and control signals 102 and 104 are derived for controlling the transmitting and receiving powers of the ERDAs 52 and 36 of the station 22n. The control signal 102 causes the ERDA 52 of the transmitting station 22n to supply signals to the station 22m at a power level which the station 22m has previously determined to be optimum for reception over the free-space link 24. The control signal 104 causes the ERDA 36 of the station 22n to supply optimal level signals to the demultiplexer 40 of the station 22n. Preferably, the transmitting and receiving gains of the ERDAs 52 and 36 are approximately equal, for maximum amplification with minimum noise introduction.

The controller 100 of the station 22n also supplies the signal 46x to the multiplexer 48 for inclusion in the next transmission to the station 22m, and the signal 46x contains signal strength information which the station 22n desires in its received transmissions from the station 22m. The information in signal 46x is present in the signal 42x received by the controller 100 of the station 22m.

The reservation of a separate wavelength for control and status signals within the communication network 20 (FIG. 1) can be employed to allow each station to establish an optimum power transmission level for each of the stations with which it communicates. A table of this power control information is established in the memory of the controller 100 of each station, based on control signals supplied by each station. The specific information for each station is accessed and used to control the optical power of the transmitting and receiving ERDAs 52 and 36 when a signal is intended for one of the stations with which the transmitting station communicates. Furthermore, because the strength of the received signals is continually updated and evaluated, the power regulation may be continually adjusted to accommodate changing atmospheric and other conditions.

The adaptive power control techniques are capable of providing a substantial link power margin or amplification. For example, the gain of the transmitting and receiving ERDAs are capable of achieving a combined gain of about 50 dB, so the link margin of the optical communication link will be increased by approximately the same amount. Using avalanche photodectors to enhance the strength of the received optical signal, in combination with the adaptive power control, achieves much higher link power margins than have been previously available in laser beam optical communication networks.

In addition to controlling the transmitted and received optical power, the controllers of each link head station may participate network management operations achieved by communicating network status and management information between the controllers in a separate wavelength signal. For example, the network management information may be included in the signals 42x and 42y (FIG. 11) which have been described in connection with adaptive power control. Each link head station may have a unique identification, and using this identification, the response and operating characteristics established by the controllers at each link head station can be separately addressed to each link head station. The unique identification allows polling the link head stations individually from a remote network management center by communicating status request information between each specific link head station and the management center. The transmission of this control, status and management information on the separate wavelength signal does not interfere with the typical information communication, because the specific wavelength signal is reserved for the status, control and management information communication.

Preferably, each station 22 also enhances the quality of its transmitted and received optical signals by physically adjusting the position and angular orientation of its transmitted and received beam focusing elements 32 and 44. Physically adjusting the position of the beam focusing elements 32 and 44 is accomplished by the position adjustment mechanism 56 shown in FIGS. 2, 4, 10 and 11.

Examples of circumstances which give rise to a physical shift in the location of the beam may include movement of the transmitting or receiving link head station, and refraction of the optical beam caused by atmospheric conditions. If the transmitting or receiving link head station is located on the top levels of a high-rise office building, and the office building sways slightly under the influence of wind, this will cause the light beam to impinge at a different location on the receiving beam focusing elements. Atmospheric conditions which include the presence of moisture in the air cause the refractive index of the atmosphere to vary according to the level of moisture in the atmosphere. A variable refractive index of the free-space between the stations will bend the beam. Other known factors may intervene to cause a shift in the physical location initially established for the optimal line-of-sight position between the transmitting and receiving beam focusing elements.

To accommodate a reasonable amount of these physical changes while maintaining a high quality optical beam, the controller 100 of each receiving station evaluates the strength of the received beam and the location where the received beam impinges on the receiving beam focusing elements 32, as illustrated by FIGS. 10 and 11. The received signals 42' (FIG. 10) and 42x and 42y (FIG. 11) are evaluated by the controller 100 of each receiving station. If the evaluation shows that the signal strength is diminished, or that the position of the beam impinging upon the beam focusing elements has shifted, the controller 100 develops control signals 106 which are delivered to the position adjustment mechanism 56. The adjustment mechanism 56 responds to the control signals 106 by moving at least one of the received beam focusing element 32 or the transmitted beam focusing element 44 until the optimum power or impingement position is achieved.

Because the atmospheric media through which the optical signal travels is the same regardless of the direction of communication of the beam, movement of the transmitting beam focusing element 44 along with the receiving beam focusing element 32 will usually position both elements in the optimal position for effective communications. However, the transmitting and receiving beam focusing elements may be separately adjusted in position if desired. The controller 100 determines the position control information for the control signal 106 independently based on the received signals, or the position control information may be established by the receiving station and communicated back to the station where the position adjustment is to occur by including control and status signals with the other information signals communicated, in the same manner that the adaptive power control signals have been communicated as discussed in conjunction with FIG. 11.

Figure 12:
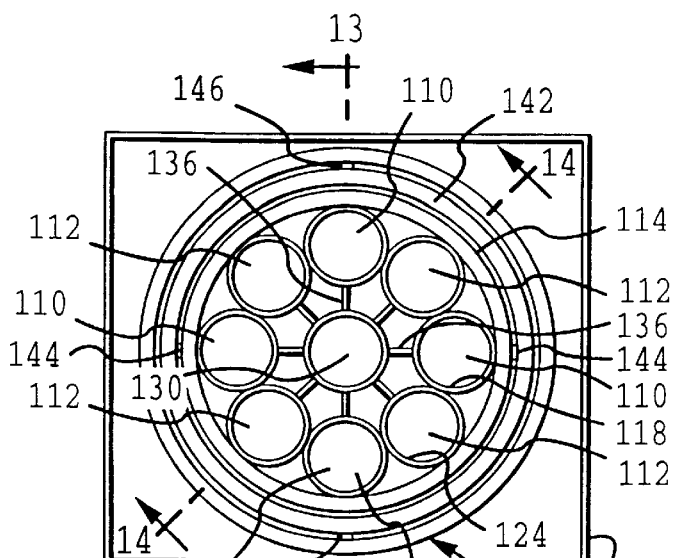
FIG. 12 is a front elevational view of a transceiver with a position adjustment mechanism employed in the network shown in FIG. 1.
Figure 13:
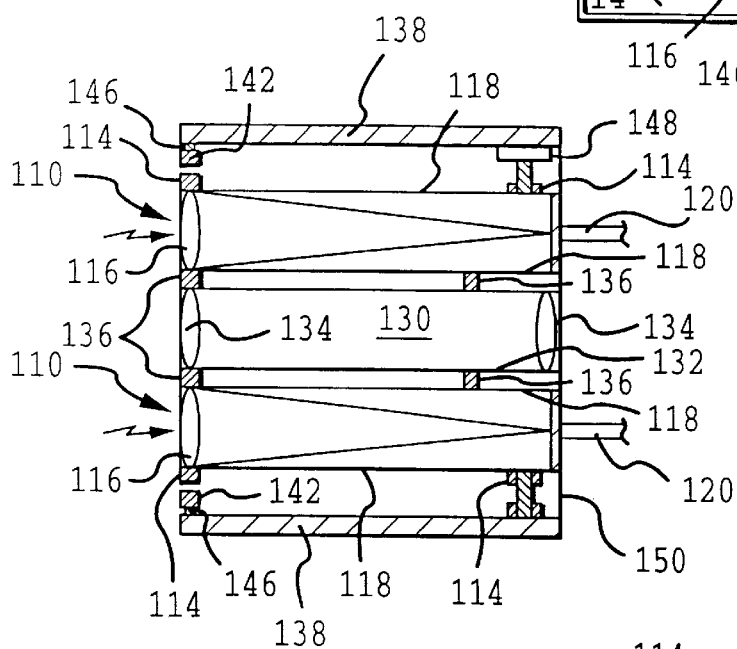
FIG. 13 is a section view taken substantially in the plane of line 13—13 of FIG. 12.
Figure 14:
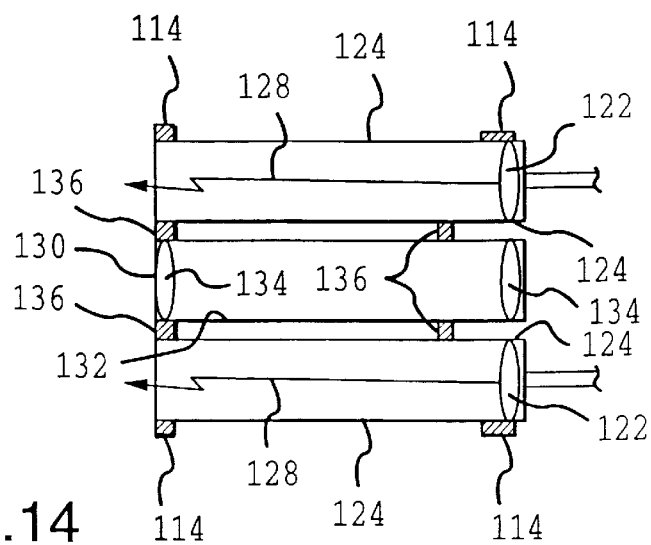
FIG. 14 is a section view taken substantially in the plane of line 14—14 of FIG. 12.

A preferred embodiment of the beam focusing element 32 and 44 and the position adjustment mechanism 56 is shown in FIGS. 12, 13 and 14. A plurality of optical receivers 110 and a plurality of optical transmitters 112 are mounted on a carrier 114. Each optical receiver 100 includes a lens 116 which refracts incoming light to a focal point within a tube 118. The tube 118 is attached to the carrier 114. An end of a fiber optic conductor 120 is located at the focal point to receive the light refracted from the lens 116. The light which enters the fiber optic conductors 120 from the optical receivers 110 is combined in a conventional beam combiner (not shown), and the combined light forms the received optical signal at 34 (FIGS. 2, 10 and 11). Similarly, each optical transmitter 112 includes a lens 122 which is mounted in a tube 124. The tube 124 is also attached to the carrier 114. The lens 122 focuses the light received from a fiber optic conductor 126 into a narrow emitted beam 128. Each optical transmitter 112 has its own fiber optic conductor 126 leading to it. The optical signal at 54, which is created by the ERDA 52 (FIGS. 2, 10 and 11), is split into separate signals by a conventional beam splitter, and one of these separate signals is supplied to each of the fiber optic conductors 126.

The optical receivers 110 and transmitters 112 are mounted on the carrier 114 with their optical axes parallel to one another. The optical axes are generally parallel to the axis of the cylindrical tubes 118 and 124 which house the receivers 110 and transmitters 112, respectively. Also mounted on the carrier 114 is an alignment telescope 130. The telescope 130 is formed by a tube 132 having lenses 134 located at each end of the tube 132. The optical axis of the telescope 130 and the axis of the tube 132 are also parallel to the optical axes of the optical receiver 110 and the optical transmitter 112. The alignment telescope 130 is used to sight the initial orientation of the optical receivers and transmitters onto the location of the optical receivers and transmitters of the link head station at the other end of the free-space link. The tubes 118, 124 and 132 are all connected together by a support structure 136, so that the optical receiver 110, the optical transmitter 112, and the alignment telescope 130 are physically retained in the parallel optical arrangement and rigidly connected to the carrier 114.

The carrier 114 is connected to a housing 138 by a gimbal 140. The gimbal 140 is formed by a ring 142 which is connected to the carrier 114 at pivot joints 144 located on diametrically opposite positions on the ring 142 and carrier 114. The carrier 114 and the attached receivers 110 and transmitters 112 and alignment telescope 130 are thus able to pivot in a plane perpendicular to an axis through the pivot joints 144. The gimbal 140 also includes two other pivot joints 146 which are displaced 90 degrees from the location of the pivot joint 144. The pivot joints 146 connect the ring 142 to the housing 138. The ring 142 is thus able to pivot in a plane perpendicular to an axis through the pivot joints 146. Thus, the pivot joints 144 and 146 of the gimbal 140 connect the optical receivers 110 and transmitters 112 so that they may pivot freely in both the horizontal and vertical planes.

Two servo motors, one of which is shown at 148, are connected between the carrier 114 and the housing 138. The servo motors are connected at 90 degree positions with respect to one another, in the two mutually perpendicular planes extending through the pivot joints 144 and 146. Diametrically opposite of each servo motor is a spring bearing 150 which is connected between the carrier 114 and the housing 138. The spring bearing 150 applies bias force on the carrier 114 which tends to force the carrier 114 toward the servo motor 148. The position of the servo motor 148 thus establishes the angle of the optical axes of the receivers 110, transmitters 112 and the alignment telescope 130 in the plane which extends through the servo motor 148 and the spring bearing 150. This angle is achieved by pivoting about the pivot joints 144 (FIG. 12). The other servo motor and its opposite spring bearing (neither of which are shown) operates in the same manner to adjust the angular orientation of the receivers 110, transmitters 112 and the alignment telescope 130 in a plane which is perpendicular to the first plane. This angle is achieved by pivoting about the pivot joints 146 (FIG. 12).

With the gimbal 140 and the position control from the servo motors established by the control signals 106 from the controller 100 (FIGS. 10 and 11), the angular position of the receivers 110 and transmitters 112 can be adjusted to accommodate the slight movements of the other link head station at the opposite end of the free-space link. The adjustment capability enhances the quality of the optical beam transmitted between the link head stations to enhance the quality and reliability of the information communicated between the link head stations. The controller 100 preferably establishes the position control in a dampened, time delayed and/or step-by-step manner to avoid an unstable hunting or oscillation of the transceiver positions at the link head stations.

The servo motors may also be replaced with any other type of device which provides reliable and precise position control, such as a piezoelectric device. The multiple receivers 110 and multiple transmitters 112 have the effect of increasing the total area of transmission and reception of the optical signals. The larger transmission and reception area offers better transfer of optical energy. The multiple transmitters and receivers also lower the impact of scintillation to enhance the quality of the optical signal communicated.

The description of the improvements available from the present invention demonstrates that ERDAs may be effectively used to create a terrestrial optical communication network which contains a hybrid combination of free-space and fiber optic links which are connected seamlessly by the all-optical ERDAs. Electro-optical conversion, and the difficulties and costs associated with it, are avoided by using the relatively inexpensive ERDAs to directly integrate the free-space and fiber optic links. Although the wavelength of optical signals conducted through the integrated hybrid terrestrial network, as required by the ERDAs, are not optimum for penetrating adverse weather conditions, the amount of power which may be transferred is substantially greater, thereby enhancing the ability to communicate. The wavelength of the ERDAs and hence the free-space transmissions is not likely to result in damage to human eyes. The power of the transmitted and received signals is effectively controlled for optimum communications under varying atmospheric conditions by adaptive power control at each link head station. The ability to control the position of the optical transceivers at each link head station also contributes to the more reliable and effective communication of optical information through the free-space links of the network. Many other improvements and advantages will also be apparent after the full ramifications of the present invention are completely understood and appreciated.

Presently preferred embodiments of the invention and its improvements have been described with a degree of particularity. This description has been made by way of preferred example. The scope of the present invention is defined by the following claims, and should not necessarily be limited by the detailed description of the preferred embodiment set forth above.

The invention claimed is:

1. A terrestrial optical communication network comprising a plurality of fiber optic links and free-space links between which optical signals are optically coupled by erbium doped fiber amplifiers (ERDAs), and further comprising means for controlling a -power gain of at least one of the ERDAs in response to an optical signal received over one of the free-space links.

2. A terrestrial optical communication network as defined in claim 1 wherein optical signals of the same predetermined fundamental wavelength are communicated over the fiber optic and free-space links by the ERDAs.

3. A terrestrial optical communication network as defined in claim 2 wherein the predetermined fundamental wavelength is the fundamental operating wavelength of the ERDAs.

4. A terrestrial optical communication network as defined in claim 3 wherein at least one fiber optic link also comprises a portion of a fiber optic backbone communication system.

5. A terrestrial optical communication network as defined in claim 3 wherein at least one fiber optic link also comprises a portion of a long-haul fiber optic communication system.

6. A terrestrial optical communication network as defined in claim 1 further comprising a repeater located in at least one of the free-space links, the repeater including ERDAs to amplify the power of the optical signals conducted through the free-space link.

7. A terrestrial optical communication network as defined in claim 1 further including at least one routing switch connected to a plurality of links, and the routing switch including ERDAs to optically couple the optical signals from one of the links connected to the routing switch to another one of the links connected to the routing switch.

8. A terrestrial optical communication network comprising a plurality of fiber optic links and free-space links between which optical signals are optically coupled by erbium doped fiber amplifiers (ERDAs), wherein a transmitting ERDA amplifies the optical signal before its transmission over at least one free-s-pace link, and further comprising a controller connected to the transmitting ERDA to control the optical power gain of the transmitting ERDA, and the control of the optical power gain of the transmitting ERDA adjusts the optical power of the optical signal transmitted over the one free-space link.

9. A terrestrial optical communication network as defined in claim 8 wherein the controller controls the optical power gain of the transmitting ERDA in response to the optical power of the optical signals received over the one free-space link.

10. A terrestrial optical communication network as defined in claim 9 wherein the controller controls the optical power gain in response to the optical power of optical signals received at the location of the transmitting ERDA.

11. A terrestrial optical communication network as defined in claim 9 wherein the controller controls the optical power gain of the transmitting ERDA in response to the optical power of the optical signals received at an opposite end of the one free-space link from which the optical signals were transmitted.

12. A terrestrial optical communication network as defined in claim 11 wherein the controller controls the optical power gain of the transmitting ERDA in response to control information contained in optical signals transmitted from the opposite end of the one free-space link.

13. A terrestrial optical communication network comprising a plurality of fiber optic links and free-space links between which optical signals are optically coupled by erbium doped fiber amplifiers (ERDAs), wherein a receiving ERDA amplifies the optical signal after its reception over at least one free-space link, and further comprising a controller connected to the receiving ERDA to control the optical power gain of the receiving ERDA, and the control of the optical power gain of the receiving ERDA adjusts the optical power of the optical signal delivered by the receiving ERDA.

14. A terrestrial optical communication network as defined in claim 13 wherein the controller controls the optical power gain of the receiving ERDA in response to the optical power of the optical signals received over the one free-space link at the location of the receiving ERDA.

15. A terrestrial optical communication network comprising a plurality of fiber optic links and free-space links between which optical signals are optically coupled by erbium doped fiber amplifiers (ERDAs), wherein a transmitting ERDA amplifies the optical signal before its transmission over at least one free-space link and a receiving ERDA amplifies the optical signal after its reception over the one free-space link, further comprising a controller connected to the transmitting ERDA to control the optical power gain of the transmitting ERDA and connected to the receiving ERDA to control the optical power gain of the receiving ERDA, and the control of the optical power gain of the transmitting ERDA adjusts the optical power of the optical signal transmitted by the transmitting ERDA over the one free-space link and the control of the optical power gain of the receiving ERDA adjusts the optical power of the optical signal delivered by the receiving ERDA.

16. A terrestrial optical communication network as defined in claim 15 wherein the controller controls the optical power gain of each of the transmitting and receiving ERDAs in response to the optical power of the optical signals received over the one free-space link.

17. A terrestrial optical communication network as defined in claim 16 wherein the controller controls the optical power gain in response to the optical power of optical signals received at the location of the transmitting ERDA.

18. A terrestrial optical communication network as defined in claim 16 wherein the controller controls the optical power gain of each of the transmitting and receiving ERDAs to approximately equal amounts.

19. A terrestrial optical communication network comprising a plurality of fiber optic links and free-space links between which optical signals are optically coupled by erbium doped fiber amplifiers (ERDAs), and further comprising transceivers which transmit and receive the optical signals over the free-space links, and a position adjustment mechanism connected to a transceiver of at least one free-space link to adjust the physical position of the transceiver relative to the optical signals transmitted over the one free-space link to optimize an amount of power provided in the one free-space link by one of the ERDAs.

20. A terrestrial optical communication network as defined in claim 19 wherein the position adjustment is determined by the power of optical signals received by the transceiver over the one free-space link.

21. A terrestrial optical communication network as defined in claim 19 wherein the position adjustment is determined by the impingement on the transceiver of optical signals received over the one free-space link.

22. A terrestrial optical communication network as defined in claim 19 wherein the position adjustment is determined based on position control information transmitted optically over the one free-space link by a transceiver located at the other end of the free-space link.

23. A terrestrial optical communication network comprising a plurality of fiber optic links and free-space links between which optical signals are optically coupled by erbium doped fiber amplifiers (ERDAs), and further comprising transceivers which transmit and receive the optical signals over the free-space links, and a position adjustment mechanism connected to a transceiver of at least one free-space link to adjust the physical position of the transceiver relative to the optical signals transmitted over the one free-space link, wherein the transceiver comprises a transmitting ERDA which amplifies the optical signal before its transmission over at least one free-space link, and a controller connected to the transmitting ERDA to control the optical power gain of the transmitting ERDA and adjust the optical power of the optical signal transmitted by the transmitting ERDA over the one free-space link in response to the optical power of the optical signals received over the one free-space link.

24. A terrestrial optical communication network comprising a plurality of fiber optic links and free-space links between which optical signals are optically coupled by erbium doped fiber amplifiers (ERDAs), and further comprising transceivers which transmit and receive the optical signals over the free-space links, and a position adjustment mechanism connected to a transceiver of at least one free-space link to adjust the physical position of the transceiver relative to the optical signals transmitted over the one free-space link, wherein the transceiver comprises a transmitting ERDA which amplifies the optical signal before its transmission over at least one free-space link and a receiving ERDA which amplifies the optical signal after its reception over the one free-space link, and a controller connected to the transmitting ERDA and the receiving ERDA, the controller controlling the optical power gain of the transmitting ERDA to adjust the optical power of the optical signal transmitted by the transmitting ERDA over the one free-space link, the controller controlling the optical power gain of the receiving ERDA to adjust the optical power gain of the optical signal delivered by the receiving ERDA, the controller controlling the optical power gain of at least one of the transmitting and receiving ERDAs in response to the optical power of the optical signals received over the one free-space link.

25. A terrestrial optical communication network comprising a plurality of fiber optic links and free-space links between which optical signals are optically coupled by erbium doped fiber amplifiers (ERDAs), and further comprising a transmitting ERDA and a receiving ERDA at a terminal end of each link, and a controller connected to at least one of the transmitting ERDA or the receiving ERDA to control the connected ERDA, and wherein an optical signal communicated over the link contains information received by the controller to manage the operation of the connected ERDA.

26. A method of terrestrial optical communication comprising the steps of:
establishing a plurality of fiber optic links and free-space links between which optical signals are communicated;
optically coupling the optical signals between the fiber optic and free-space links without electro-optical conversion; and
controlling optical power of an optical signal transmitted over one of the free-space links in response to an optical signal received over the free-space link.

27. A method of terrestrial optical communication as defined in claim 26 wherein the step of optically coupling the optical signals without electro-optical conversion comprises optically coupling the optical signals between the fiber optic and free-space links with erbium doped fiber amplifiers (ERDAs).

28. A terrestrial optical communication network comprising a plurality of links over which optical signals are communicated, comprising a transmitting ERDA which amplifies an optical signal before its transmission over a free-space link and a controller connected to the transmitting ERDA to control the optical power gain of the transmitting ERDA and to adjust the optical power of the optical signal transmitted over the free-space link in response to the optical power of optical signals received over the free-space link.

29. A terrestrial optical communication network as defined in claim 28 wherein the controller controls the optical power gain of the transmitting ERDA in response to the optical power of the optical signals received at an opposite end of the free-space link from which the optical signals were transmitted.

30. A terrestrial optical communication network as defined in claim 29 wherein the controller controls the optical power gain of the transmitting ERDA in response to control information contained in optical signals transmitted from the opposite end of the free-space link.

31. A terrestrial optical communication network as defined in claim 28 further comprising a receiving ERDA which amplifies the optical signal after its reception over the free-space link, and wherein the controller is also connected to the receiving ERDA to control the optical power gain of the receiving ERDA and adjust the optical power of the optical signal delivered by the receiving ERDA.

32. A method of terrestrial optical communication comprising the steps of:
establishing a plurality of links between which optical signals are communicated;
amplifying an optical signal before its transmission over a free-space link;
sensing the optical power of optical signals received over the free-space link;
adjusting the optical power of the optical signal transmitted over the free-space link in response to the sensed optical power of the optical signals received over the free-space link.

33. A method of terrestrial optical communication as defined in claim 32 further comprising the step of:
amplifying an optical signal received over the free-space link before the signal is delivered for use.

34. A terrestrial optical communication network comprising a plurality of links over which optical signals are communicated, comprising a transceiver which transmits and receives optical signals communicated over a free-space link and a controller connected to the transceiver to control the physical position of the transceiver relative to the optical signal path of the free-space link in response to the optical signals received over the free-space link to optimize an amount of power provided in the free-space link by a fiber amplifier.

35. A method of terrestrial optical communication comprising the steps of:
establishing a plurality of links between which optical signals are communicated;
positioning a transceiver at an end of a free-space link;
connecting an adjustment mechanism to the transceiver to adjust the position of the transceiver; and adjusting the position of the transceiver by controlling the adjustment mechanism in response to the optical signals received by the transceiver over the free-space link to optimize an amount of power provided in the free-space link by a fiber amplifier.

36. A method of communicating optical signals over a free-space link, comprising:

receiving a first optical signal of a predetermined fundamental wavelength used in a long-haul fiber optic communication system from a first fiber optic conductor;

amplifying the first optical signal of the predetermined fundamental wavelength with a fiber amplifier connected in-line with the first fiber optic conductor to form an amplified first optical signal of the predetermined fundamental wavelength;

directing the amplified first optical signal of the predetermined fundamental wavelength through the free-space link with a beam focusing element optically coupled to the fiber amplifier; and controlling a power gain of the fiber amplifier in response to a second optical signal received over the free-space link.

37. A method in accordance with claim 36, wherein the step of controlling the power gain of the fiber amplifier further comprises the step of:

controlling the power gain of the fiber amplifier in response to a determined strength of the second optical signal.

38. A method in accordance with claim 36, wherein the step of controlling the power gain of the fiber amplifier further comprises the step of:

control the power gain of the fiber amplifier in response to control information contained in the second optical signal.

39. A method in accordance with claim 36, wherein the beam focusing element is optically coupled to the fiber amplifier with a second fiber optic conductor.

40. A method in accordance with claim 36, wherein the fiber amplifier comprises an erbium doped fiber amplifier (ERDA).

41. A method in accordance with claim 36, wherein the predetermined fundamental wavelength is approximately equal to 1.55 micrometer (um).

42. An optical transceiver for communicating optical signals over a free-space link, comprising:

a first fiber optic conductor;

a fiber amplifier connected in-line with the first fiber optic conductor and configured to receive a first optical signal of a predetermined fundamental wavelength used in a long-haul fiber optic communication system from the first fiber optic conductor and amplify its optical signal power to form an amplified first optical signal of the predetermined fundamental wavelength;

a beam focusing element optically coupled to the fiber amplifier and configured to direct the amplified first optical signal of the predetermined fundamental wavelength through the free-space link; and a controller configured to control a power gain of the fiber amplifier in response to a second optical signal received over the free-space link.

43. An optical transceiver in accordance with claim 42, wherein the controller is further configured to control the power gain of the fiber amplifier in response to a determined strength of the second optical signal.

44. An optical transceiver in accordance with claim 42, wherein the controller is further configured to control the power gain of the fiber amplifier in response to control information contained in the second optical signal.

45. An optical transceiver in accordance with claim 42, wherein the beam focusing element is optically coupled to the fiber amplifier with a second fiber optic conductor.

46. An optical transceiver in accordance with claim 42, wherein the fiber amplifier comprises an erbium doped fiber amplifier (ERDA).

47. An optical transceiver in accordance with claim 42, wherein the predetermined fundamental wavelength is approximately equal to 1.55 micrometer (um).

* * * * *

UNITED STATES PATENT AND TRADEMARK OFFICE
CERTIFICATE OF CORRECTION

PATENT NO. : 6,239,888 B1
DATED : May 29, 2001
INVENTOR(S) : Willebrand

It is certified that error appears in the above-identified patent and that said Letters Patent is hereby corrected as shown below:

<u>Column 17,</u>
Line 13, change "-power" to -- power --.
Line 45, change "free-s-pace" to -- free-space --.

Signed and Sealed this

Twenty-third Day of April, 2002

Attest:

JAMES E. ROGAN
*Attesting Officer*     *Director of the United States Patent and Trademark Office*